UNITED STATES PATENT OFFICE.

EDWIN G. STAUDE, OF MINNEAPOLIS, MINNESOTA.

TRACTOR ATTACHMENT FOR AUTOMOBILES.

1,418,842.

Specification of Letters Patent. Patented June 6, 1922.

Application filed December 13, 1916. Serial No. 136,643.

*To all whom it may concern:*

Be it known that I, EDWIN G. STAUDE, a citizen of the United States, resident of Minneapolis, county of Hennepin, State of Minnesota, have invented certain new and useful Improvements in Tractor Attachments for Automobiles, of which the following is a specification.

The object of my invention is to provide a draft connection at the rear of a tractor or truck by means of which the rear traction wheels are utilized as the forward supporting wheels for a wagon box or rack trailer.

A further object is to provide a draft connection which will allow the box or rack portion of the trailer to swing on a pivotal connection and follow the direction of movement of the truck or tractor in substantially the same manner as it would if a team were used as the motive power and the traction wheel formed the forward guiding wheels of the wagon or rack.

A further object is to provide a draft connection which can be easily and quickly applied to the rear of the tractor or truck.

The invention consists generally in various constructions and combinations, all as hereinafter described and particularly pointed out in the claims.

Figure 1:
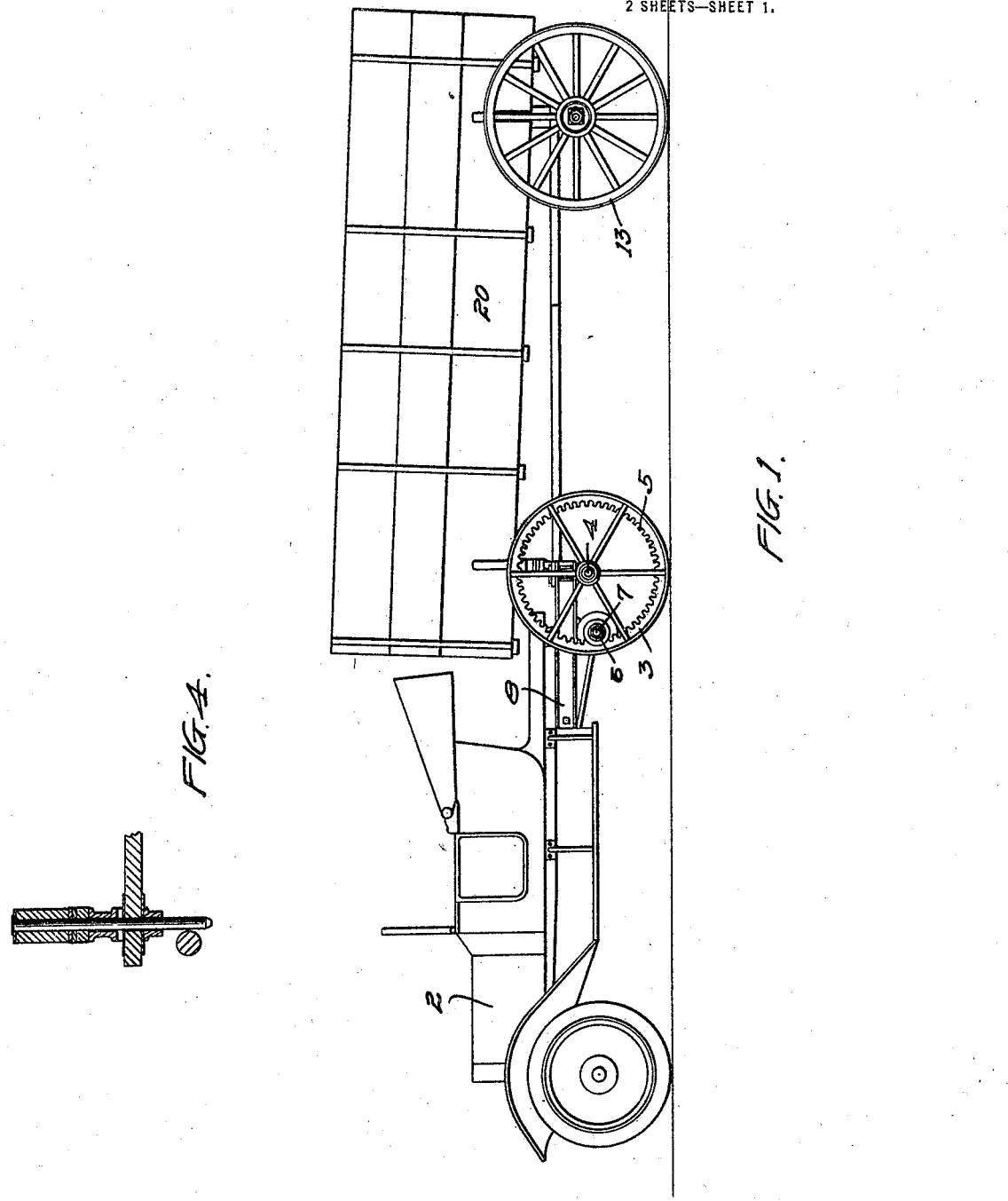
Figure 2:
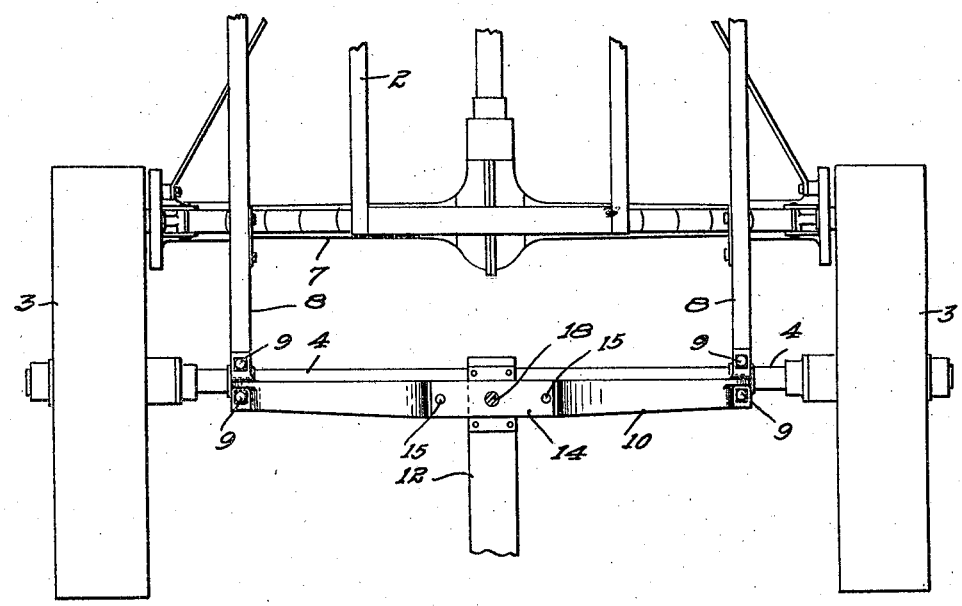
Figure 3:
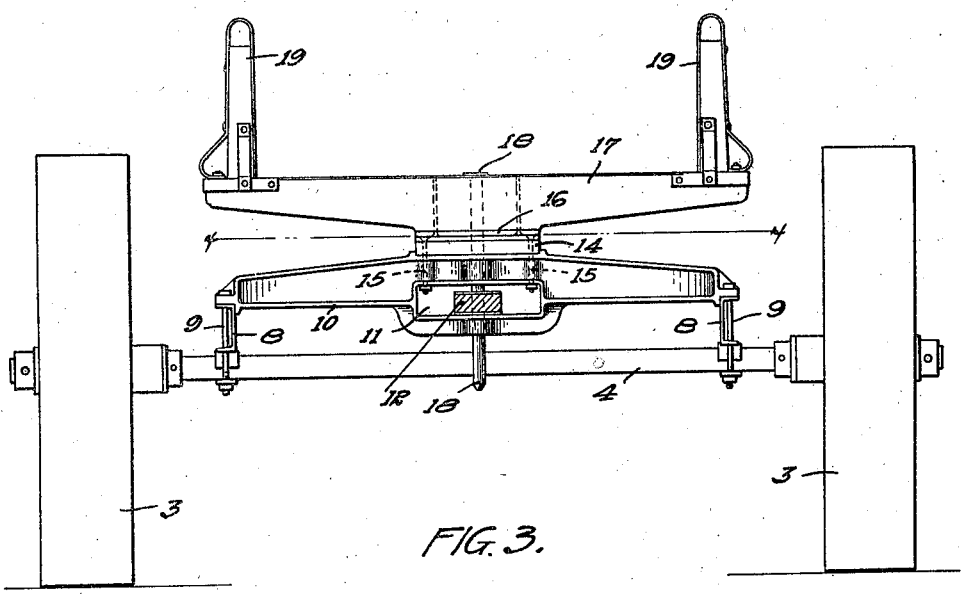

In the accompanying drawings forming part of this specification,

Figure 1 is a side elevation of a tractor, with a trailer connection attached thereto, Figure 2 is a plan view of the rear portion of the tractor, taken on line x—x of Figure 3, Figure 3 is a rear view, partially in section, of the tractor and its connection, Figure 4 is a detail view, showing the position of the king-bolt of the trailer with respect to the axle of the traction wheels.

In the drawing, 2 represents an automobile, from which the rear wheels have been removed, and traction wheels 3 having an axle 4 substituted therefor, said wheels having internal gears 5 driven by pinions 6 which are placed on the rear axle 7 of the car in place of the usual rear wheels. Side rails 8 are seated on the axle 4 at their rear ends and secured thereto by bolts 9. A bolster supporting cross bar 10 is seated on the rails 8 and secured thereto by said bolts 9 and the middle portion of this cross bar has an opening or recess 11 formed therein into which the tongue 12 of the trailer wheel 13 is inserted. A bolster block 14 is seated on the bar 10 and secured thereto by bolts 15 and a bolster plate 16 is seated on the block 14 and secured to the underside of a bolster 17. A king-bolt 18 passes through the bolster, the plate and block and the supporting bar and also through a tongue 12 forming a single pivot for connecting the trailer tongue and the bolster with the supporting bar. Suitable standards 19 are mounted on the ends of the bolster 17 and a wagon box 20 of any suitable construction is seated on the bolster between these standards and its forward end may follow the horizontal oscillation of the bolster and the turning of the tractor. The block 14 is removable and the owner or user of the apparatus, if he wishes to raise the level of the bolster for any purpose, can substitute a thicker block for the one shown, the king-bolt being of sufficient length to extend through the varying thicknesses of blocks used and being in the rear of the axle 4, will not be obstructed thereby. If preferred, a rack or other form of box or tank can be substituted for the one shown.

With this apparatus I am able to convert an automobile into a tractor with a means for supporting the forward end of the box or tank of the trailer in such a way that said end, though supported by the driving wheels, may still be oscillated or swerved from side to side in turning the machine in substantially the same manner as it would be if the traction wheels were the ordinary supporting and forward steering wheels of the wagon.

In various ways the details of construction herein shown and described may be modified and still be within the scope of my invention.

I claim as my invention:

1. The combination, with an automobile frame and its rear axle, of rails secured to said frame and projecting rearwardly beyond the rear axle, traction wheels and an axle therefor whereto said rails are secured, said traction wheels having internal gears, pinions mounted on said automobile axle for meshing with said gears to drive said wheels, a bolster mounted on said traction wheel axle for horizontal oscillation, a trailer frame having its tongue pivotally connected with said bolster, and a trailer body supported at its forward end on said bolster and having freedom of oscillation therewith.

2. The combination, with an automobile frame and its rear drive axle, of rails secured to said frame and projecting in the rear of said axle, a traction axle mounted on said rails and having traction wheels and internal gears and pinions mounted on the automobile rear drive axle for meshing with said gears, a bar secured to said rails over said traction axle, a bolster supported on said bar, a trailer having a forwardly projecting tongue, and a body to rest on said bolster, and a king bolt passing through said bolster and bar and said tongue.

3. The combination with the rear axle and wheels of a tractor, of side-bars resting upon and clamped to said rear axle and having their forward ends attached to the tractor-frame, a transverse bar resting upon and supported by the side-bars above the tractor rear-axle, a bolster located at the rear of the tractor and pivotally attached to the cross-bar supported above the tractor rear-axle, a trailer having the forward portion of its body supported on said bolster and its rear portion by wheels, and a reach connecting the rear axle of the trailer with said bar supported from the rear axle of the tractor.

4. The combination with the rear axle and wheels of a tractor, of a bolster attachment comprising parallel side bars connected one to the other at their rear ends by a crossbar resting on top of said bars and formed with a central opening to receive the end of a wagon-reach, a bolster pivotally mounted on said cross-bar, a king-bolt to pass through the bolster, cross-bar and reach, the parallel bars of the attachment resting upon the rear axle of the tractor and supporting said cross-bar in a raised position above the axle, means for clamping the cross-bar to the parallel side bars and said bars to the axle, and means for attachment of the forward ends of said side bars to the tractor frame, said attachment and bolster serving to support the forward end of a wagon or trailer-body over the rear axle of the tractor so as to permit horizontal oscillatory movement of the trailer body relatively to the rear axle of the tractor.

In witness whereof, I have hereunto set my hand this 9th day of December, 1916.

EDWIN G. STAUDE.